US012368996B2

(12) United States Patent
Graugaard

(10) Patent No.: US 12,368,996 B2
(45) Date of Patent: Jul. 22, 2025

(54) METHOD OF OUTPUTTING SOUND AND A LOUDSPEAKER

(71) Applicant: CLANG, Copenhagen V (DK)

(72) Inventor: Lars Graugaard, Copenhagen V (DK)

(73) Assignee: CLANG, Copenhagen (DK)

( * ) Notice: Subject to any disclaimer, the term of this patent is extended or adjusted under 35 U.S.C. 154(b) by 173 days.

(21) Appl. No.: 18/030,469

(22) PCT Filed: Sep. 24, 2021

(86) PCT No.: PCT/EP2021/076395
§ 371 (c)(1),
(2) Date: Apr. 5, 2023

(87) PCT Pub. No.: WO2022/073775
PCT Pub. Date: Apr. 14, 2022

(65) Prior Publication Data

US 2023/0370777 A1 Nov. 16, 2023

(30) Foreign Application Priority Data

Oct. 7, 2020 (EP) .................................... 20200429
Apr. 7, 2021 (DK) .......................... PA 2021 70162

(51) Int. Cl.
*H04R 3/14* (2006.01)
*H04S 7/00* (2006.01)

(52) U.S. Cl.
CPC ............... *H04R 3/14* (2013.01); *H04S 7/307* (2013.01); *H04R 2430/03* (2013.01); *H04S 2420/07* (2013.01)

(58) Field of Classification Search
None
See application file for complete search history.

(56) References Cited

U.S. PATENT DOCUMENTS 7,003,467 B1 2/2006 Smith et al.
8,787,585 B2 7/2014 Brown
2005/0271214 A1* 12/2005 Kim ........................ H04S 1/002 381/17
2022/0007125 A1* 1/2022 Petroff .................... H04S 1/002

FOREIGN PATENT DOCUMENTS

EP 1786240 A2 5/2007
EP 1814360 A2 8/2007
WO WO-2020074553 A1 * 4/2020 ............. H04R 1/403

OTHER PUBLICATIONS

European Search Report from corresponding EP Application No. EP20200429, Feb. 26, 2021.
International Search Report from corresponding PCT Application No. PCT/EP2021/076395, Jan. 13, 2022.

(Continued)

*Primary Examiner* — James K Mooney
(74) *Attorney, Agent, or Firm* — Workman Nydegger

(57) ABSTRACT

A method of converting an audio signal into signals for a number of loudspeaker transducers, where the audio signal is divided up into audio sub signals each representing a particular frequency interval, and where the signal for each loudspeaker transducer comprises a portion of each audio sub signal which varies over time.

14 Claims, 4 Drawing Sheets

(56) References Cited

OTHER PUBLICATIONS

Valimaki et al., "All About Audio Equalization: Solutions and Frontiers," Applied Sciences, vol. 6, Iss. 5, May 6, 2016, pp. 1-46.
Notification Concerning Informal Communications with the Applicant—Second Written Opinion from corresponding PCT Application No. PCT/EP2021/076395, Nov. 2, 2022.
International Preliminary Report on Patentability from corresponding PCT Application No. PCT/EP2021/076395, Dec. 21, 2022.

* cited by examiner

METHOD OF OUTPUTTING SOUND AND A LOUDSPEAKER

BACKGROUND

The present invention relates to a method of outputting sound and in particular to a method of imparting spatial information into a sound signal.

Known speaker systems are stereo set-ups, surround set-ups or omni-directional set-ups where stationary speakers output "stationary" audio signals in the sense that a speaker may comprise loudspeaker transducers for different frequency bands but that the same loudspeaker transducer will receive at least substantially all of the electrical audio signal within its band and will at least substantially output all of the sound in that band at all times.

Omni-directional speaker systems reflect sound radially over 360 degrees from a central point, with sound dispersion substantially in the vertical plane. These systems can have different strategies for dispersing mono and stereophonic sound, where some omni systems have drivers facing straight upwards or at an angle, while others use drivers radiating upwards into a curved or conical reflector. Although claiming to be omni-directional, none of them are true spherical speaker systems, and they all aim to emit a desired waveform in a fixed or stationary manner.

Conventional surround sound systems aim to enrich the fidelity and depth of sound reproduction by using multiple loudspeaker transducers arranged at the front, sides and back of a listener. Surround sound systems exist in a variety of formats and number of loudspeaker transducers, but they all aim to emit a desired waveform in a fixed or stationary manner. This may be regardless of the listening environment of the vast range of different acoustic spaces in which they are installed, or it may be based on an automatized or user defined process that tailors the sound to a particular listing environment, as customizable sound fields. Common to these systems is that they ignore, or aim to negate or suspend, the listening environment's effect on the playback, and once established, these fixed, customizable or user-definable sound fields remain stable.

Consequently, these conventional systems operate with an "optimal" playback in one installation arrangement and one "ideal" listening position within a given listening environment. This results in a marked difference between the relatively poor reproduction of the music through loudspeakers, and the complex and rich sound diffusion of an acoustic performance of the music, a difference that has haunted the audio system industry since the beginning. These systems also fail to provide any enrichment to other, constructed, sound fields, such as studio recordings and digitally created, or otherwise non-acoustically produced music content or other audio content. Furthermore, an acoustic space is never entirely constant due to minor movements of people, objects and other elements in the space, which provides minute variations to the sound that are important for the sound's overall perceived quality. The present audio system also may take this fact into account, in its process of bringing about, or procuring, additional three-dimensional audio cues to the incoming audio signal, whereby a listener hears the sound reproduction in a three-dimensional manner, as if the listener is in the same space as the sound sources. This in contrast to a two-dimensional manner, where a listener, unless in a highly determinate listening position and -conditions, hears the sound as if coming into the listening space from outside.

SUMMARY

A first aspect of the invention relates to a method of outputting sound based on an audio signal, the method comprising:

- receiving the audio signal,
- generating a number of audio sub signals from the audio signal, each audio sub-signal representing the audio signal within a frequency interval within the frequency interval of 100-8000 Hz, where the frequency interval of one sub signal is not fully included in the frequency interval of another sub signal,
- providing a speaker comprising a plurality of sound output drivers or loudspeaker transducers each capable of outputting sound in at least the interval of 100-8000 Hz, the loudspeaker transducers being positioned within a room or venue,
- generating an electrical sub signal for each loudspeaker transducer, each electrical sub signal comprising a predetermined portion of each audio sub signal, and
- feeding the electrical sub signals to the loudspeaker transducers,
- wherein the generation of the electrical sub signals comprises altering, over time, the predetermined portions of the audio sub signals in each electrical sub signal.

In the present context, the audio signal may be received on any format, such as analogue or digital. The signal may comprise therein any number of channels, such as a mono signal, a stereo audio signal, a surround sound signal or the like. Audio signals often are encoded by a codec, such as FLAC, ALAC, APE, OFR, TTA, WV, MPEG and the like. Often, the audio signal comprises frequencies of all of or most of the audible frequency interval of 20 Hz-20 kHz, even though audio signals may be suited for a more narrow frequency interval, such as 40 Hz-15 kHz.

An audio signal normally corresponds to a physical or sound desired output, where correspondence is that the audio signal has, at least within a desired frequency band, the same frequency components, often in the same relative signal strengths, as the sound. Such components and relative signal strengths often change over time, but the correspondence preferably does not.

The audio signal may be transported wirelessly or via wires, such as a cable (optical or electrical). The audio signal may be received from a streaming or live session or from a storage of any kind.

It is desired to output a sound signal corresponding to the audio signal or at least a frequency interval thereof. The present invention focusses on sound in the frequency band in which human ears are able to determine a direction from which the sound arrives, and the interaction of the sound within this frequency interval in the room or venue. This frequency interval may be seen as the frequency interval of 100-8000 Hz, but it may be selected between e.g. 300 and 7 kHz, between 300 and 6 kHz, between 400 and 4 kHz, or between 200 and 6 kHz if desired.

The auditory system uses several cues for sound source localization, including time- and level-differences (or intensity/loudness-difference) between both ears, spectral information, timing analysis, correlation analysis, and pattern matching. Interaural Level Differences is taking place in the range 1.500 Hz-8000 Hz, where level difference is highly frequency dependent and increasingly so with increasing frequency. Interaural Time Differences is predominant in the range 800-1.500 Hz, with Interaural Phase Difference in the range of 80-800 Hz.

For frequencies below 400 Hz, the dimensions of the head (ear distance 21.5 cm, corresponding to an interaural time delay of 625 μs) are smaller than the quarter wavelength of the sound waves, so the confusion on phase delays between ears starts to be a problem. Below 200 Hz, Interaural Level Difference becomes so small so that a precise evaluation of the input direction is nearly impossible on the basis of ILD alone. Below 80 Hz, phase differences, ILD, and ITD all become so small so that it is impossible to determine the direction of the sound.

With the same head-size considerations, for frequencies above 1.600 Hz the dimensions of the head are greater than the wavelength of the sound waves: so phase information becomes ambiguous. However, the ILDs become larger, plus group delays become more pronounced at higher frequencies; that is, if there is a sound onset, a transient, the delay of this onset between the ears can be used to determine the input direction of the corresponding sound source. This mechanism becomes especially important in reverberant environments.

According to the invention, a number of audio sub signals are generated from the audio signal, each audio sub signal representing the audio signal within a frequency interval within the frequency interval of 100-8000 Hz, where the frequency interval of one sub signal is not fully included in the frequency interval of another sub signal. Thus, a sub signal represents the audio signal within a frequency interval. The sub signal may be desired to comprise the relevant portion of the audio signal. A sub signal may be generated by applying a band pass filter and/or one or more high pass and/or low pass filters to the audio signal to select the desired frequency interval. The sub audio signal may be identical to the audio signal within the frequency interval, but filters are often not ideal at the edges thereof (extreme frequencies), where the filters often lose quality so that frequencies below the centre frequency of a high pass filter are allowed to some degree to pass, for example.

No audio sub signal has a frequency interval fully included in a frequency interval of another audio sub signal. Thus, the audio sub signals all represent different frequency intervals of the audio signal. Thus, for each frequency within the 100-8000 Hz interval, their representation in the audio sub signals will not be the same. The frequency may fall within the frequency interval(s) of one or more of the audio sub signals and not other(s). Naturally, frequency intervals may overlap. The filtering efficiency (Q value) may be selected as desired. The filtering may be performed in discrete components, in a DSP, in a processor or the like.

In order to output the sound or at least the sound defined by the audio sub signals, a speaker is provided comprising a plurality of sound output loudspeaker transducers each capable of outputting sound in at least the desired frequency interval of 100-8000 Hz. The loudspeaker transducers may be identical or have identical characteristics, such as identical impedance curves. Alternatively, the loudspeaker transducers may be of different types. It is preferred that the same signal, such as an audio signal or an audio sub signal, generates the same sound when output from each loudspeaker transducer. Loudspeaker transducers of different types or with different characteristics may nevertheless be used such as when an electrical sub signal for a loudspeaker transducer is adapted to the pertaining loudspeaker transducer so that all loudspeaker transducers output at least substantially the same sound, i.e. each has the same relationship between a sound output, such as for one or more frequencies, and a signal, adapted and fed into the loudspeaker transducer to generate the sound.

The loudspeaker transducers are positioned within a room or venue and may be directed in at least 3 different directions. The room or venue may have one or more walls, a ceiling and a floor. It is preferred that the room or venue has one or more sound reflecting elements, such as walls/ceiling/floor/pillars and the like.

A combination of loudspeaker transducers may be also chosen so as to represent a 180 degree sphere, such as the half of a sphere coming off from a flat surface. Such a flat surface could be a keyboard surface or a laptop surface or a screen surface.

The direction of a loudspeaker transducer may be a main direction of sound waves output by the loudspeaker transducer. Loudspeaker transducers may have an axis, such as a symmetry axis, along which the highest sound intensity is output or around which the sound intensity profile is more or less symmetric.

The loudspeaker transducers are directed in at least 3 different directions. Directions may be different if an angle of at least 5°, such as at least 10°, such as at least 20°, exists between these, such as when projected onto a vertical or horizontal plane, or when translated so as to intersect. An angle between two directions may be the smallest possible angle between the two directions. Two directions may extend along the same axis and in opposite directions. Clearly, more than 3 different directions may be preferred, such as if more than 4, 5, 6, 7, 8 or 10 loudspeaker transducers are used.

A particularly interesting embodiment is one where one loudspeaker transducer is provided on each side of a cube and directed so as to output sound in directions away from the cube. In this embodiment, 6 different directions are used. In another embodiment, the loudspeaker transducers are positioned on walls and on the ceiling and in the floor—and directed so as to feed sound into the space between the loudspeaker transducers.

An electrical sub signal is generated for each loudspeaker transducer. In this manner, each loudspeaker transducer may be operated independently of the other loudspeaker transducers. Clearly, if a large number of loudspeaker transducers is used, multiple loudspeaker transducers may be driven or operated identically. Such identically driven loudspeaker transducers may have the same or different directions.

In this context, an electrical sub signal is a signal intended for a loudspeaker transducer. This signal may be fed directly to a loudspeaker transducer or may be adapted to the loudspeaker transducer, such as by amplification and/or filtering. In addition, the electrical sub signal may be of any form, such as optical, wireless or in electrical wires. An electrical sub signal may be encoded using any codec if desired or may be digital or analogue. A loudspeaker transducer may comprise decompression, filters, amplifier, receiver, DAC or the like to receive the electrical sub signal and drive the loudspeaker transducer.

Each electrical sub signal may be adapted in any desired manner before being fed to a loudspeaker transducer. In one embodiment, the electrical sub signal is amplified before feeding into the loudspeaker transducer. In that or another embodiment, the electrical sub signal may be adapted, such as filtered or equalized in order to have its frequency characteristics adapted to those of the pertaining loudspeaker transducer. Different amplification and adaptation may be desired for different loudspeaker transducers.

Each electrical sub signal comprises or represents a predetermined portion of each audio sub signal. This portion may be zero for some audio sub signals. Then, each audio sub signal may be, in a mathematical manner of speaking, multiplied by a weight or factor, whereafter all resulting audio sub signals are summed to form the electrical sub signal. Clearly, this processing may take place in a computer, processor, controller, DSP, FPGA or the like, which will then output the or each electrical sub signal for feeding to the loudspeaker transducer or to be converted/received/adapted/amplified before being fed to the loudspeaker transducer.

Naturally, the electrical sub signals and/or the audio sub signals may be stored between generation thereof and fed to the loudspeaker transducers. Thus, a new audio format may be seen in which such signals are stored in addition to or instead of the actual audio signal.

When the electrical sub signals are fed to the loudspeaker transducers, the sound is output.

It is preferred that a sum of the audio sub signals is at least substantially identical to the portion of the audio signal provided within the outer frequency intervals of the audio sub signals. Thus, the audio sub signals may be selected so as to represent that portion of the audio signal. The portions of the audio signal outside of this overall frequency interval may be handled differently. In this context, an intensity of the sum of the audio sub signals may be within 10%, such as within 5% of the energy/loudness of the corresponding portion of the audio signal. Also or alternatively, the energy/loudness in each frequency interval of a predetermined width, such as 100 Hz, 50 Hz or 10 Hz, of the combined audio sub signals may be within 10%, such as within 5% of the energy/loudness in the same frequency interval of the audio signal.

Naturally, a scaling or amplification may be allowed so that the overall desire is to not obscure the frequency components within that frequency interval of the audio signal. Thus, it may be desired that for one, two, three, multiple or each pair of two frequencies within the frequency interval, the intensity of the summed audio sub bands, at that frequency, is within 10%, such as within 5% of the intensity of the audio signal. Thus, the relative frequency intensities are desired maintained.

In the same manner, it is preferred that a sum of the electrical sub signals is at least substantially identical to the portion of the audio signal provided within the outer frequency intervals of the electrical sub signals. Thus, the electrical sub signals may represent that portion of the audio signal. The portions of the audio signal outside of this overall frequency interval may be handled by other transducers. In this context, an intensity of the sum of the electrical sub signals may be within 10%, such as within 5% of the energy/loudness of the corresponding portion of the audio signal. Also or alternatively, the energy/loudness in each frequency interval of a predetermined width, such as 100 Hz, 50 Hz or 10 Hz, of the combined electrical sub signals may be within 10%, such as within 5% of the energy/loudness in the same frequency interval of the audio signal.

Naturally, a scaling or amplification may be allowed so that the overall desire is to not obscure the frequency components within that frequency interval of the audio signal. Thus, it may be desired that for one, two, three, multiple or each pair of two frequencies within the frequency interval, the intensity of the summed electrical sub bands, at that frequency, is within 10%, such as within 5% of the intensity of the audio signal. Thus, the relative frequency intensities are desired maintained from the audio signal to the sound output.

Clearly, the electrical sound signals are desirably coordinated so that the sound output from all loudspeaker transducers are correlated so that the audio signal is correctly represented. Thus, the generation of the audio sub signals, the electrical sub signals and any adaptation/amplification preferably retains the coordination and phase of the signals.

According to the invention, the generation of the electrical sub signals comprises altering, over time, the predetermined portions of the audio sub signals in each electrical sub signal. Thus, the generation of each electrical sub signal, reverting to the above mathematical manner of speaking, takes place where the weight(s) multiplied to the audio sub signals vary over time, so that the proportion, in an electric sub signal, of a predetermined audio sub signal varies over time.

The manner in which the portions or proportions vary over time may be selected in a number of manners, which are described below. In one manner, the audio sub signals may be thought of as virtual loudspeaker transducers each outputting sound corresponding to that particular signal. One or more of the real loudspeaker transducers then output a portion of the sound from the virtual loudspeaker transducer depending on where the virtual loudspeaker transducer is positioned, and potentially how it is directed, compared to the real loudspeaker transducers. This type of abstraction is also seen in standard stereo set-ups where the position of a virtual sound generator, such as a string section in a classical orchestra, may be positioned away from the real loudspeaker transducers of the stereo set-up and yet be represented by sound sounding as if it comes from this virtual position.

Thus, the portion of an audio sub signal provided in an electronic sub signal may be determined by a correlation in a desired position, and potentially direction, of the virtual loudspeaker transducer corresponding to the audio sub signal and the position, and potentially direction, of the real loudspeaker transducers. The closer the position, and the more aligned the direction if relevant, the larger a portion of the audio sub signal may be seen in the electric sub signal of that loudspeaker transducer.

The determination may be made, for example, by simulating the positions of the real loudspeaker transducers and the virtual loudspeaker transducers on a geometrical shape, such as a sphere, where the real loudspeaker transducers have fixed positions but the virtual loudspeaker transducers are allowed to move over the shape. Then, the portion of the audio signal of a virtual loudspeaker transducer in an electrical signal for a real loudspeaker transducer may be determined based on the distance between the pertaining virtual loudspeaker transducer and the virtual real loudspeaker transducer.

In one embodiment, the step of receiving the audio signal comprises receiving a stereo signal. In this situation, the step of generating the audio sub signals could comprise generating, for each channel in the stereo audio signal, a plurality of audio sub signals.

Then, a number of audio sub signals may relate to the right channel and a number of audio sub signals may relate to the left channel. It may be desired that pairs of one audio sub signal of the left and one sub signal of the right channel may exist which have at least substantially the same frequency intervals and that the virtual loudspeaker transducers of such pairs are directed at least substantially oppositely or at least not in the same direction. This is obtained by selecting the portions in the electric sub signals accordingly, knowing the positions, and potentially the directions, of the loudspeaker transducers. It may also be desired that each pair of the audio sub signals have more independence, and that they do not have a coordination, or that the coordination concerns avoiding a full coincidence in the direction between the left and the right channel of the same sub band.

In one embodiment, the step of receiving the audio signal comprises receiving a mono signal and generating from the audio signal a second signal being at least substantially phase inverted to the mono signal. In this situation, the step of generating the audio sub signals may comprise generating, a plurality of audio sub signals for each of the mono audio signal and the second signal.

Then, these two signals may be treated as the above left and right signals of a stereo signal so that a number of audio sub bands may relate to the mono signal and a number of audio sub bands may relate to the other channel. It may be desired that pairs of one audio sub band of the mono signal and one sub band of the other signal may exist which have at least substantially the same frequency intervals and that the virtual loudspeaker transducers of such pairs are directed at least substantially oppositely or at least not in the same direction. This is obtained by selecting the portions in the electric sub signals accordingly, knowing the positions, and potentially the directions, of the loudspeaker transducers.

The sub band of the central band where there is spatial audio cues can be generated or defined by several means, the number of sub bands generally provides better results with higher number of sub bands. It can also be an advantage to set the frequency borders logarithmically, and one sub band division may be in 3 bands with the boundaries (Hz) at 100, 300, 1.200 and 4000. Another division, here in 6 bands, can have the boundaries (Hz) at 100, 200, 400, 800, 1.600, 3.200 and 6.400. Such lower number sub bands can be given to 1, 2, 3 or more virtual drivers, so that the same sub band is distributed into 1, 2, 3 or more simultaneous virtual drivers, in different positions on the virtual sphere. This enhances the results, as the number of virtual drivers contributes significantly towards the smoothness of the resulting audio sphere.

Sub band division may also follow other concepts, for instance the Bark scale, which is a psycho-acoustical scale on which equal distances correspond with perceptually equal distances. An 18 sub band division on the Bark scale would set the sub band boundaries (Hz) at 100, 200, 300, 400, 510, 630, 770, 920, 1080, 1270, 1480, 1720, 2000, 2320, 2700, 3150, 3700 and 4400.

For a large number of sub bands, a division into ⅓ octave would also be successful, with the sub band boundaries (Hz) at 111, 140, 180, 224, 281, 353, 449, 561, 707, 898, 1122, 1403, 1795, 2244, 2805, 3534, 4488, 5610 and 7069.

Sub bands may also be constructed by subtraction, so that a 5 sub band subtractive method would give the sub band boundaries (Hz) at 100, 200, 400, 800, 1.600 and 3.200, and the sub bands for each virtual driver would consist of the combinations band1+band3, band1+band4, band2+band4, band2+band5, band3+band5.

Furthermore, a dynamic boundary approach is also possible as it may provide a smoother rendering of the incoming sound onto the sound sphere and this is discussed in depth elsewhere in this document.

The above examples of methods for determining the sub band boundaries all provide slightly different results, in that the timbre, or "flavour", of the sound sphere will vary to a certain extent. However, they are all admissible and conceptually consistent ways to prepare for the addition, or procurement, of spatial audio cues in the audio sphere.

Once the sub band boundaries are determined by using any number of bands as described above, it is possible to calculate the estimates of energy, power, loudness or intensity of a signal in each sub band. This usually involves nonlinear, time-averaged operations such as squared sums or logarithmic operations, plus smoothing, and results in sub-band quantities that can be compared to each other, or those of a target signal such as pink noise. By this comparison, it is possible to adjust the sub-band quantities by multiplying them with a constant gain factor. These gains can be 1) determined by a theoretical signal or noise model, such as pink noise, 2) dynamically estimated by storing the highest gain measured in the real-time operation within pre-determined levels, or 3) by machine learning of the gains previously observed in training. Another way of adjusting sub-band quantities is to change the frequencies of the boundaries dynamically, as discussed in depth elsewhere in this document.

One embodiment further comprises the step of deriving, from the audio signal, a low frequency portion thereof having frequencies below a first threshold frequency, such as 100 Hz, and including the low frequency portion at least substantially evenly in all electrical sub signals or in proportion to the sub signal in the same virtual driver. In this manner, the audio signal with low frequencies is output by all audio sub signals and/or all electrical sub signals. It may alternatively be desired to provide this low frequency signal in only some audio sub signals and/or some electrical sub signals.

An alternative would be to provide this low frequency not by the loudspeaker transducers but by one or more separate loudspeaker transducer(s).

One embodiment further comprises the step of deriving, from the audio signal, a high frequency portion thereof having frequencies above a second threshold frequency, such as 8000 Hz, and including the high frequency portion at least substantially evenly in all electrical sub signals or in proportion to the sub signal in the same virtual driver. In this manner, the audio signal with high frequencies is output by all audio sub signals and/or all electrical sub signals. It may alternatively be desired to provide this high frequency signal in only some audio sub signals and/or some electrical sub signals.

An alternative would be to provide this high frequency not by the loudspeaker transducers but by one or more separate loudspeaker transducer(s).

As mentioned above, the selection of the portions of the audio sub signals represented in each electrical sub signal may be performed based on a number of considerations.

In one situation, it is desired that the sound energy, loudness or intensity in each audio sub signal and/or electric sub signal may be the same or at least substantially the same. On the other hand, it may be desired that the overall sound output corresponds to the audio signal so that the correspondence seen between e.g. the intensities/loudness of pairs of different frequencies should be the same or at least substantially the same in the audio signal and the sound output. Thus, the energy or loudness in an audio sub band may be increased by increasing the intensity/loudness thereof at one, more or all frequencies in the pertaining frequency interval, but this may not be desired. Alternatively, the intensity/loudness within the frequency interval may be increased by widening the frequency interval. Such a dynamic boundary approach may also be used for determining the combined frequency bands' two outer frequency boundaries, pertaining the low frequency component and the high frequency component. This may be calculated before the individual frequency bands are calculated, and these outer frequency boundaries may be calculated so that the coherence of the combined signal emitted by the combined loudspeaker transducers has the desired degree of correspondence, or similarity with the input sound.

In this context, sound or signal energy, loudness or intensity may be determined in a number of manners. One way would be to calculate the spectral envelope by means of the Fourier transform that would return the magnitude of each frequency bin of the transform, corresponding to the amplitude of the particular frequency band. Subsequently integrating the resulting envelope as weights in the frequency domain and segmenting the result into the number of equal sizes equivalent to the number of sub bands provides the new frequency borders of the sub bands, as the borders coincide with the crossing points on the frequency axis of each segment derived from the integration.

Another way would be to calculate the spectral envelope by means of a filter-bank analysis, where the filter bank divides the incoming sound into several separate frequency bands and returns the amplitude of each band. This may be accomplished by a large number of band-pass filters, which could be 512, or more, or less, and the resulting band center and loudness is integrated in a similar manner as in the previous example.

Another variation of the filter-bank example would be to use a non-uniform filter bank where the number of filter bands is the same as the number of sub bands in the particular implementation. The slope and center frequency of each filter in the filter bank can be used to calculate the width of the sub band, from which to derive the frequency boundaries between the sub bands.

A further variation would be to use a bank of octave band filters and static weighting, followed by the integration step outlined above.

A different method is to use music similarity measurements developed in Music Information Retrieval (MIR), which deals with the extraction and inference of meaningful and computable features from the audio signal. Having such a collection of features, and the proper segmentation into frequency sub bands, a simple look-up process may determine the category of the music being played with the system, and dynamically set the frequency bands accordingly.

Finally, statistical methods such as machine learning by feature can be used to make predictions and decisions regarding the appropriate frequencies for the sub band boundaries for a given audio input, where an algorithm is trained in advance with a large collection of sample audio data.

Thus, the step of generating the audio sub signals may comprise selecting the frequency interval for one or more of the audio sub signals so that a combined energy in each audio sub signal is within 10% of a predetermined energy/loudness value. Thus, all audio sub signals have an energy/loudness within 10% of this value. Naturally, the predetermined energy/loudness value may be a mean value of the audio sub signal energy/loudness values. Alternatively, an energy/loudness may be determined of the audio signal itself, or a channel thereof for example. This energy/loudness may be divided into the number of audio sub signals desired for the audio signal or the channel. For example, the energy/loudness in the audio signal in the interval 100-8000 Hz may be determined and divided by three if three audio sub signals are desired. Then, the energy/loudness of each audio signal should be between 90% and 110% of this calculated energy/loudness. Then, the frequency intervals may be adapted to achieve this energy/loudness. It is re-capitulated that the frequency intervals may be allowed to overlap.

It is re-capitulated that the above energy/loudness considerations may relate to the audio sub signals and/or the electrical sub signals.

In a particularly interesting embodiment, the portions of the audio sub signals represented in a—or each—electrical sub signal varies rather significantly. Thus, it may be desired that the step of generating the electrical sub signals comprises, for one or more electrical sub signal(s), generating the electrical sub signal so that a portion of an audio sub band represented in the electrical sub band increases or decreases by at least 5% per second. Thus, the portion, which may be a percentage of the energy/loudness/intensity of the audio sub band, varies per second more than 5%. Thus, if at t=0, the percentage is 50%, at t=1 s, the percentage is 47.5% or lower or 52.5% or higher.

Especially when the loudspeaker transducers are provided on the outer surface of an enclosure, such as a speaker cabinet of any desired size and shape, the audio sub signals may be seen as individual virtual loudspeaker transducers moving around in the cabinet or on the surface of the cabinet or a predetermined geometrical shape. The positions, and optionally also directions if not assumed to be in predetermined directions, thereof are correlated to the positions, and potentially directions, of the real loudspeaker transducers and is used for calculating the portions or weights. The variation over time of the portions may then be obtained by simulating a rotation or movement of the individual virtual loudspeaker transducers in or on the shape.

Clearly, the sound output by a virtual loudspeaker transducer is that output by the real loudspeaker transducers receiving a portion of the audio sub signal forming the virtual loudspeaker transducer. The portion fed to each loudspeaker transducer as well as the loudspeaker transducer's position, and potentially its direction, will determine the overall sound output from the virtual loudspeaker transducer. Re-positioning or rotating the virtual loudspeaker transducer is performed by altering the intensity/loudness of the corresponding sound in the individual loudspeaker transducers—and thus altering the portions of that audio sub signal in the loudspeaker transducers or electrical sub signals.

A second aspect of the invention relates to a system for outputting sound based on an audio signal, the system comprising:

an input for receiving the audio signal, a speaker comprising a plurality of sound output loudspeaker transducers each capable of outputting sound in at least the interval of 100-8000 Hz, the loudspeaker transducers being positioned within a room or venue, a controller configured to:

generate a number of audio sub signals from the audio signal, each audio sub-signal representing the audio signal within a frequency interval within the frequency interval of 100-8,000 Hz, where the frequency interval of one sub signal is not fully included in the frequency interval of another sub signal, generate an electrical sub signal for each loudspeaker transducer, each electrical sub signal comprising a predetermined portion of each audio sub signal, and means for feeding the electrical sub signals to the loudspeaker transducers, wherein the controller is configured to generate each of the electrical sub signal so that the predetermined portions of the audio sub signals in each electrical sub signal altering over time.

In the present context, a system may be a combination of separate elements or a single, unitary element. The input, controller and speaker may be a single element configured to receive the audio signal and output sound.

Alternatively, the controller may be separate or separatable from the speaker so that the electrical sub signals or audio signals may be generated remotely from the speaker and then fed to the speaker.

Clearly, the controller may be one or multiple elements configured to communicate. Thus, the audio sub signals may be generated in one controller and the electrical sub signals in another controller. As mentioned below, a new codec or encapsulation may be generated whereby the audio sub signals or electrical sub signals may be forwarded in a controlled and standardized manner to a controller or speaker which may then interpret these and output the sound.

As mentioned above, the audio signal may be on any format, such as any of the known codecs or encoding formats. The audio signal may be received from a live performance, a streaming or a storage.

The input may be configured to receive the signal from a wireless source, from an electrical cable, from an optical fibre, from a storage or the like. The input may comprise any desired or required signal handling, conversion, error correction or the like in order to arrive at the audio signal. Thus, the input may be an antenna, a connector, an input of the controller or another chip, such as a MAC, or the like.

A speaker is configured to receive a signal and output a sound. In this context, the speaker comprises a plurality of loudspeaker transducers configured to output sound. The loudspeaker transducers direct sound in at least 3 different directions which are described above.

Multiple loudspeaker transducers may be directed in the same direction if multiple loudspeaker transducers are required to e.g. cover all of the frequency interval covered by the frequency intervals of the audio sub signals. If this frequency interval is broad and the loudspeaker transducers have a more narrow operating frequency interval, a number of different loudspeaker transducers may be required per direction.

Also, if a directionality of a loudspeaker transducer is too narrow, it may be desired to provide multiple such loudspeaker transducers with only slightly diverting directions to cover a particular angular interval with the audio sub signal in question.

As mentioned, a much larger number of directions may be used.

The electrical sub signals are to be fed to the loudspeaker transducers. The controller or the part thereof generating the electrical sub signals may be provided in the speaker so that these need not be transported to the speaker. Alternatively, the speaker may comprise an input for receiving these signals. Clearly, this input should be configured to receive such signals and, if required, process the signal(s) received to arrive at signals for each loudspeaker transducer. This processing may be a deriving of the electrical sub signals from a generic or combined signal received by the speaker input.

The frequency interval in question is at least 100-8000 Hz but may be narrower.

The controller is configured to generate a number of audio sub signals from the audio signal. This process is described further above.

It is noted that the number of audio sub signals need not correspond to the number of electrical sub signals.

As mentioned above, the same or another controller may generate the electrical sub signals from the audio signals and in the manner where the portions of the audio sub signals in each electrical sub signal varies over time.

In one embodiment, the input is configured to receive a stereo signal. Then, the controller could be configured to generate a plurality of audio sub signals for each channel in the stereo audio signal. The audio sub signals corresponding to the same frequency interval may then be fed to predetermined loudspeaker transducers and also over time so that the two signals are not fed to the same loudspeaker transducer (included in the same electrical sub signal) with too high portions.

In another embodiment, the input is configured to receive a mono signal. Then, the controller could be configured to generate, from the audio signal, a second signal being at least substantially phase inverted to the mono signal, and to generate a plurality of audio sub signals for each of the mono audio signal and the second signal. The audio sub signals corresponding to the same frequency interval may then be fed to predetermined loudspeaker transducers and also over time so that the two signals are not fed to the same loudspeaker transducer (included in the same electrical sub signal) with too high portions.

In one embodiment, the controller is further configured to derive, from the audio signal, a low frequency portion thereof having frequencies below a first threshold frequency, which could be 100 Hz, 200 Hz, 300 Hz, 400 Hz or any frequency there between, and include the low frequency portion at least substantially evenly in all electrical sub signals. Alternatively, the speaker could comprise a separate loudspeaker transducer fed with this low frequency signal.

In one embodiment, the controller is further configured to derive, from the audio signal, a high frequency portion thereof having frequencies above a second threshold frequency, which could be 4000 Hz, 5000 Hz, 6000 Hz, 7000 Hz or 8000 Hz or any frequency there between, and include the high frequency portion at least substantially evenly in all electrical sub signals. Alternatively, the speaker could comprise a separate loudspeaker transducer fed with this high frequency signal.

In one embodiment, the controller is further configured to select the frequency interval for one or more of the audio sub signals so that a combined energy, such as a combined loudness, in each audio sub signal is within 10% of a predetermined energy/loudness value. As described above, it may be preferred that the energy, loudness or intensity in each audio sub signal is the same. In order to achieve this, the frequency interval of each audio sub signal may be adapted. The predetermined energy value may be a mean energy or loudness value of all audio sub signals or all audio sub signals in e.g. a channel, or a percentage of the energy/loudness of the audio signal, such as within the overall frequency interval of the audio sub signals.

In one embodiment, the controller is further configured to, for one or more electrical sub signal(s), generate the electrical sub signal so that a portion of an audio sub band represented in the electrical sub band increases or decreases by at least 5% per second. In this manner, the portion of the audio sub signal in the electrical sub signal varies quite a lot.

BRIEF DESCRIPTION OF THE DRAWINGS

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation.

DETAILED DESCRIPTION

Figure 1:
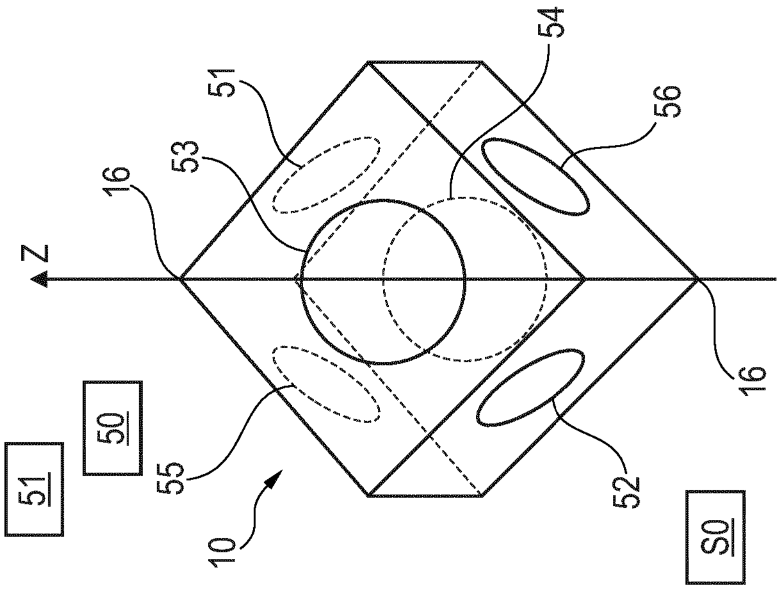
FIG. 1 illustrates an embodiment of an audio device.

The following describes various innovative principles related to systems for providing sound spheres having smoothly changing, or constant, three-dimensional in-air transitions. For example, certain aspects of disclosed principles pertain to an audio device configured to project a desired sound sphere, or an approximation thereof, throughout a listening environment.

Embodiments of such systems described in the context of method acts are but particular examples of contemplated systems, chosen as being convenient illustrative examples of disclosed principles. One or more of the disclosed principles can be incorporated in various other audio systems to achieve any of a variety of corresponding system characteristics.

Thus, systems having attributes that are different from the specific examples discussed herein can embody one or more presently disclosed innovative principles, and can be used in applications not described herein in detail. Accordingly, such alternative embodiments also fall within the scope of this disclosure.

In some implementations, the innovation disclosed herein generally concern systems and associated techniques for providing three-dimensional sound spheres with multiple beams, that combine to provide smoothly changing sound localization information. For example, some disclosed audio systems can project subsections in frequency bands of the sound in subtly changing, or constant, phase relationships, and independent amplitude to the loudspeaker transducers. Thereby, the audio system can render added, or procured, spatial information to any input audio throughout a listening environment.

As but one example, an audio device can have an array of loudspeaker transducers constituting each an independent full-range transducer. The audio device includes a processor and a memory containing instructions that, when executed by the processor, cause the audio device to render a three-dimensional waveform as a 360 degree spherical shape, in weighted combination of individual virtual shape components, as coordinated pairs of shape component or otherwise, that are slowly moved along the loudspeaker transducers by a panning process of the audio signals. For each loudspeaker transducer, the audio device can filter a received audio signal according to a designated procedure. When executing the dynamic sound sphere, the audio device retains the original sound across the combined sphere components, when they are summed in the acoustic space. Therefore, for the listener the resulting sound retains the original sound's frequency envelope, but with the addition, or procurement, of a dynamic, or constant, three-dimensional audio spatialization.

The disclosure can combine its three-dimensional audio rendering with a summed signal above and below two designated thresholds, where the audio signal outside the thresholds holds no information about a sound's localization, discernible to the cognitive listening apparatus. These two ranges are summed separately into two monophonic audio signals and can be sent to all loudspeaker transducers simultaneously. The audio device can thereby provide the full three-dimensional spatialization that the cognitive listening apparatus can recognize, together with an independent control for all loudspeaker transducers of the low and high frequency ranges.

The disclosure can manage one mono signal input on one audio device in a number of independent sphere components that is equal to the number of the device's loudspeaker transducers, or a number of virtual sphere components that is different from the number of the device's loudspeaker transducers. Each sphere component can be a subset of a frequency range, and all components can be evenly distributed along the range as a balanced sum total of the components. These components can then be panned independently on all loudspeaker transducers on the geometric solid's planes, or as polar inverted pairs at opposite points on the geometric solid, or otherwise modified, and they can be positioned at any point between adjacent planes. Used in a paired stereo configuration with two devices, such a system will provide separate three-dimensional spatialization on each of the monophonic audio channels, and, rendered the left channel and the right channel separately to the two audio devices, resulting in a three-dimensional stereophonic audio rendering system. The stereo pairs can also be panned individually, and not observe any correlation in opposite points.

The disclosure can manage one stereo signal on one audio system in a number of independent iterations that is equal to half the number of the unit's loudspeaker transducers. Each pair is a subset of the frequency range of the stereo signal and can be positioned at opposite points on the geometric solid, or at any point between the solid's adjacent planes. The stereo pairs are panned equally, so that a single audio device will give a satisfactory rendering of the input stereo signal, hereby eschewing the need for two devices for rendering the full information of the original stereophonic signal, while still procuring the described three-dimensional audio cues. The result is a point source, three-dimensional stereophonic audio rendering system.

The instructions stored in processor memory can produce an adaptable division of the frequency bands that can, if so desired, observe equal loudness between the bands. This will avoid sudden directional changes due to changes in energy/loudness at very localized frequency ranges.

I Overview

Figure 2:
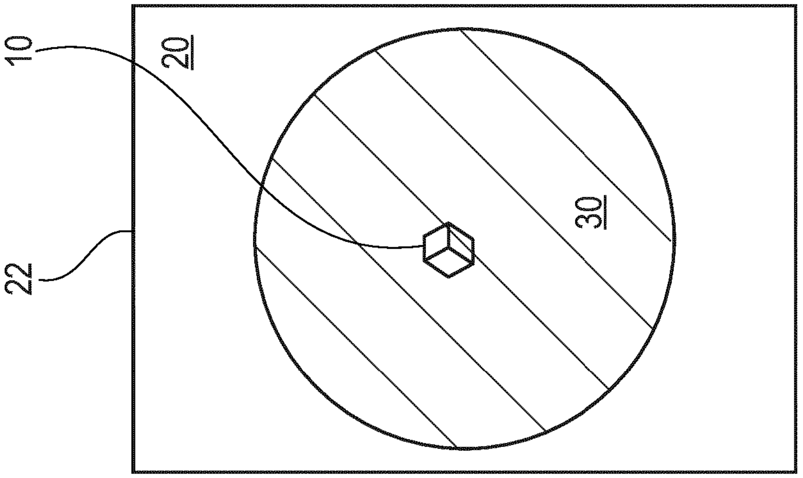
FIG. 2 illustrates a sound sphere corresponding to a representative listening environment.

Referring now to FIGS. 1 and 2, an audio device, or speaker, 10 can be positioned in a room 20. A three-dimensional sound sphere 30 is rendered by the audio device 10, where the listener's optimal listening area coincides with the sphere 30.

Figure 3:
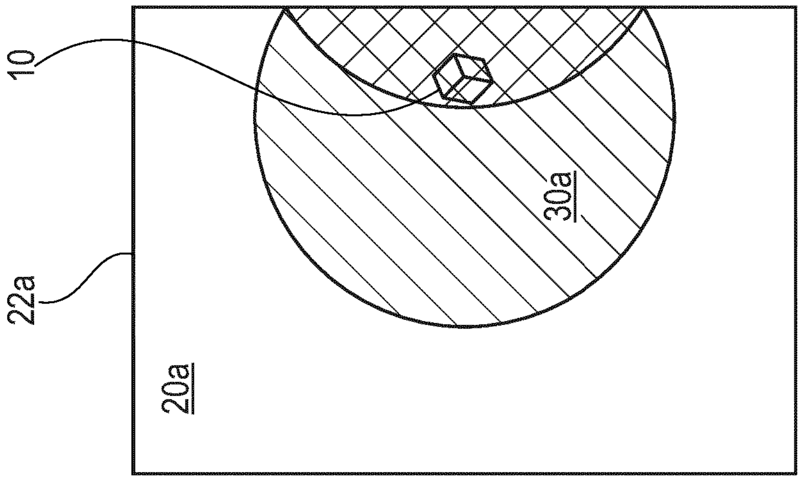
FIG. 3 illustrates another possible sound sphere corresponding to another representative listening environment.
Figure 4:
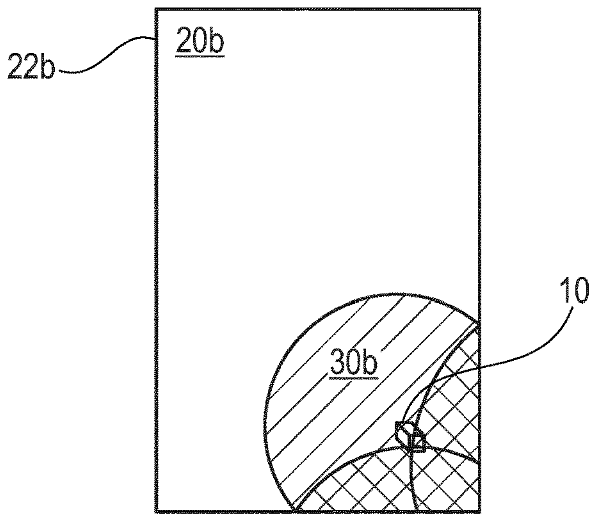
FIG. 4 illustrates another possible sound sphere corresponding to another representative listening environment.

FIGS. 3 and 4 show other exemplary representations of device 10 positioning. The audio device 10 can correspond to a position of one or more reflective boundaries, e.g., a wall 22*a*, 22*b*, relative to the device 10, as well as listener's likely position 26*a*, 26*a*, coinciding with the sound sphere 30*a*, 30*b*. The rendered three-dimensional sound sphere 30*a*, 30*b*, is reinforced as the waveform folds back from the walls.

As will be explained more fully below, a three-dimensional sound sphere can be constructed by a combination of sphere components. A three-dimensional sound sphere is dependent on change of amplitude, phase and time along different audio frequencies, or frequency bands. A methodology can be devised to manage such dependencies, and disclosed audio devices can apply these methods to an acoustic signal, or a digital signal, containing an audio content to render as a three-dimensional sound sphere.

Section II describes principles related to such an audio device by way of reference to the device depicted in FIG. 1. Section III describes principles pertaining to desired three-dimensional sound spheres, and Section IV describes principles related to decomposing an audio content into a combination of sphere components, both virtual and real, and reassembling them in acoustic space. Section V discloses principles in directivity relating to the three-dimensionality of an audio device and variations thereof with frequency. Section VI describes principles related to audio processors suitable to render an approximation of a desired three-dimensional sound sphere from an incoming audio signal, on input 51, containing an audio content. Section VII describes principles related to computing environments suitable for implementing disclosed processing methods. This will include examples of machine-readable media containing instructions that, when executed, cause a processor 50 of, e.g., a computing environment, to perform one or more disclosed methods. Such instructions can be embedded in software, firmware, or hardware. In addition, disclosed methods and techniques can be carried out in a variety of forms of signal processor, again, in software, firmware, or hardware.

II. Audio Devices

FIG. 1 shows an audio device 10 that includes a loudspeaker cabinet 12 having integrated therein a loudspeaker array including a plurality of individual loudspeaker transducers or loudspeaker transducers S1, S2, . . . , S6.

In general, a loudspeaker array can have any number of individual loudspeaker transducers, despite that the illustrated array has six loudspeaker transducers. The number of loudspeaker transducers depicted in FIG. 1 is selected for convenience of illustrations. Other arrays have more or fewer than six transducers, and may have more, or less, than three axis of transducer pairs, and an axis can have only one transducer. For example, an embodiment of an array for the audio device can have 2, 3, 4, 5, 6, 7, 8, 9, 10, 11, or more, loudspeaker transducers.

In FIG. 1, the cabinet 12 has a generally cubic shape defining a central axis z arranged to the opposed corners 16 of the cubic cabinet.

Each of the loudspeaker transducers S1, S2, . . . , S6 in the illustrated loudspeaker array are distributed evenly on the cube's planes at a constant, or a substantially constant, position relative to, and at a uniform radial distance, polar, and azimuth angle from, the axis' center. In FIG. 1, the loudspeaker transducers are spherically spaced from each other by about 90 degrees.

Other arrangements for the loudspeaker transducers are possible. For instance, the loudspeaker transducers in the array may be distributed evenly within the loudspeaker cabinet 10, or unevenly. As well, the loudspeaker transducers S1, S2, . . . , S6 can be positioned at various selected spherical positions measured from the axis center, rather than at constant distance position as shown in FIG. 1. For example, each loudspeaker transducer can be distributed from two or more axis points.

Each transducer S1, S2, . . . , S6 may be an electrodynamic or other type of loudspeaker transducer that may be specially designed for sound output at particular frequency bands, such as woofer, tweeter, midrange, or full-range, for example. The audio device 10 can be combined with a seventh loudspeaker transducer S0, to supplement output from the array. For example, the supplemental loudspeaker transducer S0 can be so configured to radiate selected frequencies, e.g., low-end frequencies as a subwoofer. The supplemental loudspeaker transducer S0 can be built into the audio device 10, or it can be housed in a separate cabinet. In addition or alternatively, the S0 loudspeaker transducer may be used for high frequency output.

Although the loudspeaker cabinet 10 is shown as being cubic, other embodiments of a loudspeaker cabinet 10 have another shape. For example, some loudspeaker cabinets can be arranged as, e.g., a general prismatic structure, a tetrahedral structure, a spherical structure, an ellipsoidal structure a toroidal structure, or as any other desired three-dimensional shape.

III. The Three-Dimensional Sound Sphere

Referring again to FIG. 2, the audio device 10 can be positioned in the middle of a room. In such a situation, as noted above, the three-dimensional sound sphere is distributed evenly around the audio device 10.

By projecting acoustic energy in a three dimensional sphere, a user's listening experience can be enhanced in comparison to two-dimensional audio system, since, and in contrast to prior art in one and two-dimensional sound fields, the three-dimensional listening cues provided by the disclosure are spatial and hence immersive, similarly to sound cues in the physical world.

Furthermore, the disclosure's listening space provides infinite listening positions around the device 10, as the added spatial audio cues do not operate on the basis of an ideal listening position, as long as the entire listening field, or sphere, contains an even balance, or an almost even balance, of the salient features of the original sound input.

FIG. 3 depicts the audio device 10 in a different position than is shown in FIG. 2. In FIG. 2, the sound field 30 has a circular shape, and only directing little or no acoustic energy toward the walls 22. Although the three-dimensional sound sphere shown in FIG. 3 is different from that shown in FIG. 2, the sound sphere shown in FIG. 3 can be well suited to the loudspeaker's illustrated position compared to the wall 22 and the possible listening positions coinciding with the, now partially folded, sound sphere 30 shown in FIG. 3, because the wall 22 reflections are not incompatible with the sound sphere 30, since the sphere components are shifted constantly along the loudspeaker transducers, hereby avoiding any constant enforcement of a specific frequency, or frequency band. Similarly, FIG. 4 shows the audio device 10 in yet another position in the room, and a three-dimensional sound sphere 30 that coincides with the listening positions, again correspondingly folded by the wall positions 22, and room arrangement, compared to the position of the audio device 10 shown in FIG. 2. In this particular arrangement, the same situation concerning the sound sphere's 30 projection by means of shifting sphere components as in FIG. 3 is occurring, resulting in no constant enforcement of any specific frequency, or frequency band.

In some embodiments of audio devices, a three-dimensional sound field can be modified when the audio device's 10 proximity to a wall 22 is extreme, or very pronounced. For example, by representing the three-dimensional sound sphere 30 using polar coordinates with the z-axis of the audio device 10 positioned at the origin, a user can modify the sound sphere 30 from a sphere to an asymmetrical tri-axial ellipsoidal shape, by means of "drawing", as on a touch screen, a directional scaling of the loudspeaker transducers' amplitude, relative to the z-axis of the audio device 10.

In still other embodiments, a user can select from a plurality of three-dimensional asymmetrical tri-axial ellipsoids stored by the audio device 10 or remotely. If stored remotely, the audio device 10 can load the selected tri-axial asymmetrical ellipsoid over a communication connection. And in still further embodiments, a user can "draw" a desired tri-axial asymmetrical ellipsoid contour or existing room boundary, as above, on a smartphone or a tablet, and the audio device 10 can receive a representation of the desired asymmetrical tri-axial ellipsoid, or room boundary, directly or indirectly from the user's device over a communication connection. Other forms of user input beside touch screens can be used, as described more fully below in connection with computer environments.

IV. Modal Decomposition and Reassembly of a Three-Dimensional Sound Sphere

Figure 5:
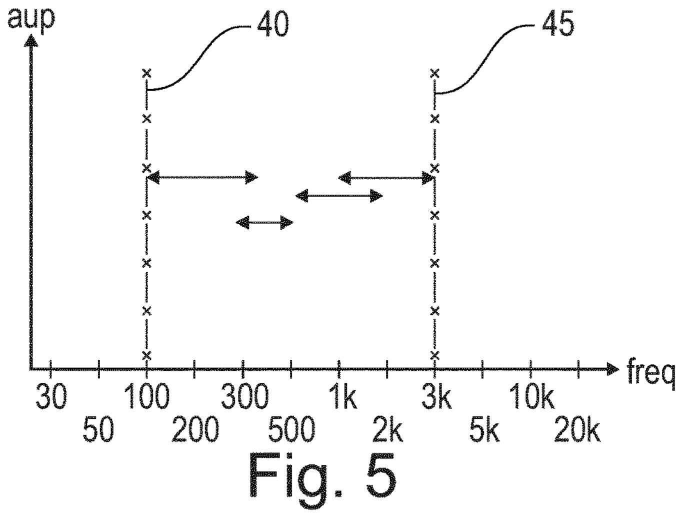
FIG. 5 illustrates the frequency range for spatial, sound source localization.

FIG. 5 shows the frequency range between 40 (positioned at 100 Hz) and 45 (positioned at 3 kHz), as a subset of the total frequency range of the listener's hearing, that a listener uses for spatial sound source localization in three-dimensional hearing. The cues for sound source localization include time and level differences between both ears, spectral information, timing analysis, correlation analysis, and pattern matching. The disclosure uses this knowledge of the auditory system to add, or procure, spatial information to an input sound, by splitting the frequency range between 40 and 45 into a number of bands (arrows), and processing these bands. The number of bands can be half the number of loudspeaker transducers, and it can be more, and less, the number of transducers.

Figure 6:
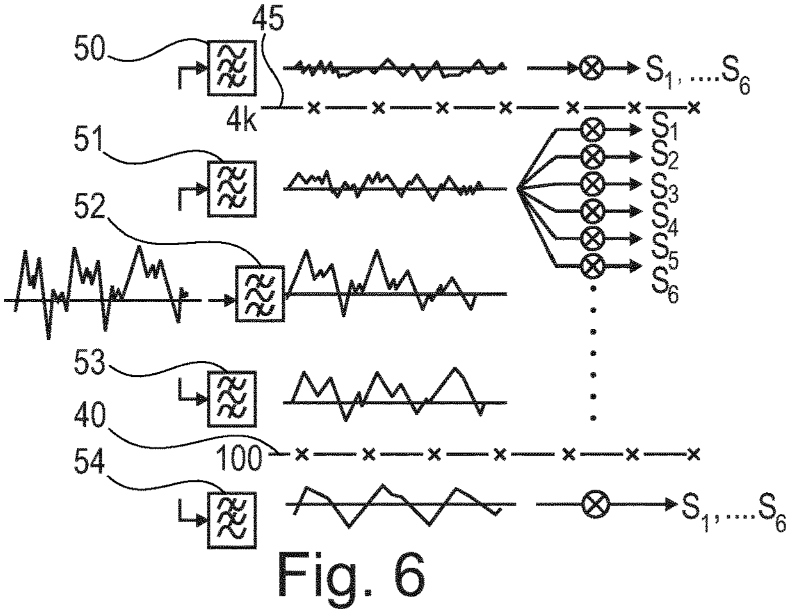
FIG. 6 illustrates a sound distribution on the loudspeaker transducers.

As means of but one example, and not of all possible embodiments, in FIG. 6, the high-pass filter 50, the band-pass filters 51, 52, and 53, and the low-pass filter 54, separate the audio stream into five sub-streams or audio sub signals. The high pass filter removes signal components above 4 kHz and the low pass filter components below 100 Hz. The audio streams from the filters 50 and 54 lie outside of the three-dimensional hearing range, and are sent equally to all loudspeaker transducers S1, S2, . . . , S6 according to different methods—or to the loudspeaker transducer S0. A copy of the signal from each frequency band from the filters 51, 52, and 53, can be modified by applying a degree of phase shift, or by polarity inversion, before sending the modified signal to different points, such as the opposite point at 180 degrees in relation to the original signal, of the audio device 10, as a summation of the individual signals to arrive at the signals for the loudspeaker transducers S1-S6. The resulting audio output is a monophonic sound with the addition of independent spatial cues in three pairs of connected sphere components, for a monophonic, three-dimensional sound sphere. In a variant of this example, the audio streams from the filters 51, 52, and 53 are sent separately to the loudspeaker transducers S1, S2, . . . , S6 and moved in a random, or semi random, but coordinated fashion. This will likewise provide the spatial cues for a monophonic, three-dimensional sound sphere, but of a significantly different nature to the previous example.

Figure 7A:
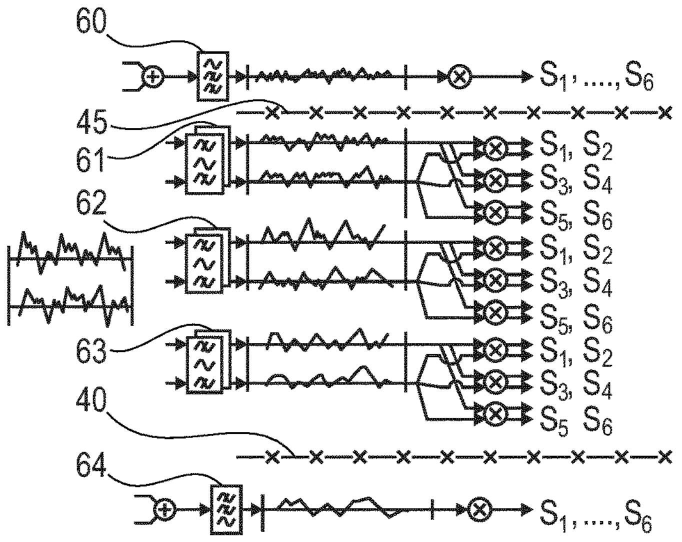
FIG. 7*a* illustrates another sound distribution on the loudspeaker transducers.

FIG. 7*a* represents the same scenario, but with a stereo signal input. As means of but one example, and not of all possible embodiments, in FIG. 7*a*, the high-pass filter 60, band-pass filters 61, 62, and 63, and the low-pass filter 64, separate the audio into five audio streams. The audio streams from filters 60 and 64 lie outside of the three-dimensional hearing range, and are sent equally to all loudspeaker transducers S1, S2, . . . , S6, as summed mono signals for the low-passed audio and for the high passed audio prior to emission, as they do not provide any, or very little, spatial information, or as two separate audio streams for the left and/or for the right channel of the low-passed audio and of the high-passed audio. The audio streams from filters 61, 62, and 63 that lie inside the three-dimensional hearing range are sent separately, but now pair-wise to the loudspeaker transducers [S1, S2], [S3, S4], [S5, S6], or to any axis points between the transducers. The resulting audio output is a stereophonic sound with addition, or procurement, of spatial cues to provide a point-source, stereophonic, three-dimensional sound field.

Figure 7B:
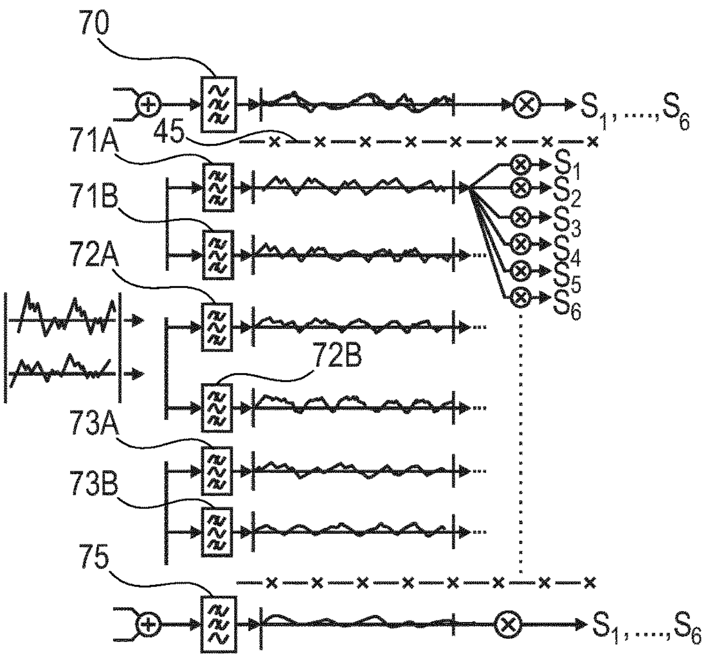
FIG. 7*b* illustrates another sound distribution on the loudspeaker transducers.

FIG. 7*b* represents a scenario where a stereo signal input is treated as separate mono channels. As means of but one example, and not of all possible embodiments, in FIG. 7*b*, the high-pass filter 70, band-pass filters 71A, 71B, 72A, 72B, 73A, 73B and the low-pass filter 74, separate the audio into eight audio streams. The audio streams from filters 70 and 74 lie outside of the three-dimensional hearing range, and are sent equally to all loudspeaker transducers S1, S2, . . . , S6, as summed mono signals for the low-passed audio and for the high passed audio prior to emission, as they do not provide any, or very little, spatial information, or as two separate audio streams for the left and/or for the right channel of the low-passed audio and of the high-passed audio. The audio streams from filters 71A, 71B, 72A, 72B, 73A, 73B that lie inside the three-dimensional hearing range are sent separately, to the loudspeaker transducers [S1, S2, S3, S4, S5, S6], or to any axis points between the transducers. The resulting audio output is a multiple single-directional sound with addition, or procurement, of spatial cues to provide a point-source, multiple single-directional, three-dimensional sound field. Thus, compared to FIG. 7*a*, there need be no correlation between the angles between the directions in which the corresponding audio sub signals (relating to the same sub bands) are output.

V. Directivity Considerations

Figure 8:
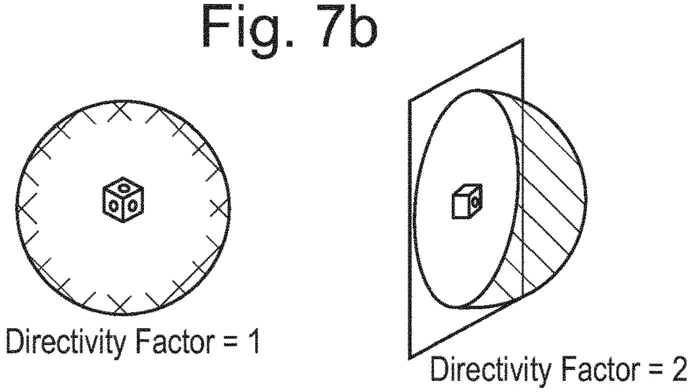
FIG. 8 illustrates three-dimensional directivity factors.

FIG. 8 represents aspects of the sound device's 10 Directivity Factor. The Directivity Factor, with the range 1–∞, is the indication of the ability of a loudspeaker transducer (or any other sound emitter) to confine the applied energy into a spherical section. Audio devices exhibit differing degrees of directivity throughout the audible frequency range (e.g., about 20 Hz to about 20 kHz), generally exhibiting lower Directivity Factor as the frequency approaches 20 Hz, and increasing Directivity Factor with increasing frequency. The disclosed audio device's 10 Directivity Factor is 1, or close to 1, along the entire frequency range, given the loudspeaker transducers distributed evenly, or nearly evenly on an even sided, geometric solid. The disclosed audio device's 10 individual loudspeaker transducer Directivity Factor will be 2 at low frequencies, or close to 2, and will vary across the frequency range, but it will go towards higher values with higher frequency. With a Directivity Factor of 8, each transducer will have a spherical part that, in combination of 6 transducer on the cube cabinet described above, combines into a full sphere for the audio device 10. Since the directed energy for a single loudspeaker transducer determines a defined listening window, as a selected range of angular positions at a constant radius with the loudspeaker positioned at the origin, a user's listening experience is diminished if the user's position relative to the loudspeaker varies. The disclosure, having a much lower Directivity Factor, has an infinite, or much larger, number of desired listening positions, than previous art in two-dimensional sound fields.

To achieve a desired sound sphere or smoothly varying sphere components (or pattern) over all frequencies, the sphere components described above can undergo equalization so each sphere component provides a corresponding sound field with a desired frequency response throughout. Stated differently, a filter can be designed to provide the desired frequency response throughout the sphere component. And, the equalized sphere components can then be combined to render a sound sphere having a smooth transition of sphere components across the range of audible frequencies and/or selected frequency bands, within the range of audible frequencies.

VI. Audio Processors

Figure 9:
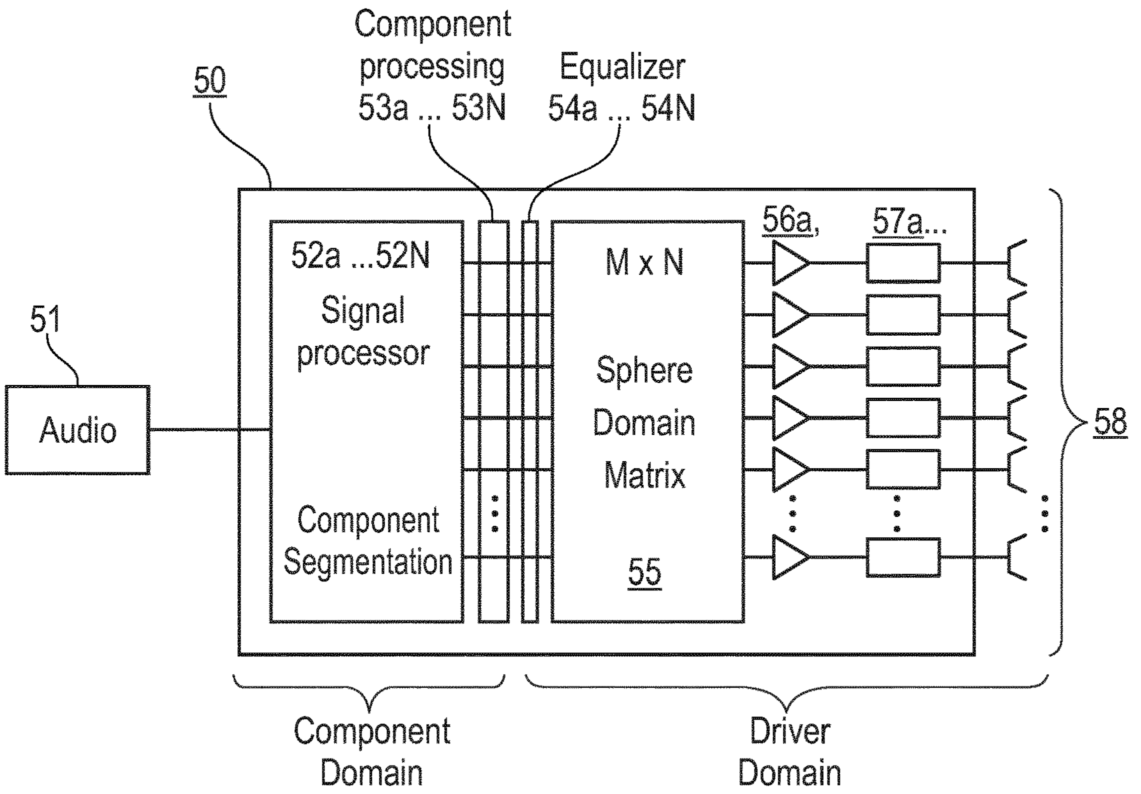
FIG. 9 illustrates the audio processing environment.

FIG. 9 shows a block diagram of an audio rendering processor for an audio device 10 to playback an audio content (e.g., a musical work, a movie sound track).

The audio rendering processor 50 may be a special purpose processor such as an application specific integrated circuit (ASIC), a general purpose microprocessor, a field programmable gate array (FPGA), a digital signal controller, or a set of hardware logic structures (e.g., filters, arithmetic logic units, and dedicated state machines). In some instances, the audio rendering processor can be implemented using a combination of machine-executable instructions, that, when executed by a processor, cause the audio device to process one or more input channels as described. The rendering processor 50 is to receive the input channel of a piece of sound program content from an input audio source 51.

The input audio source 51 may provide a digital input or an analog input. The input audio source or input 51 may include a programmed processor that is running a media player application program and may include a decoder that produces the digital audio input to the rendering processor. To do so, the decoder may be capable of decoding an encoded audio signal, which has been encoded using any suitable audio codec, e.g., Advanced Audio Codec (AAC), MPEG Audio Layer II, MPEG Audio LAYER III, and Free Lossless Audio Codec (FLAC). Alternatively, the input audio source may include a codec that is converting an analog or optical audio signal, from a line input, for example, into digital form for the audio rendering processor 50. Alternatively, there may be more than one input audio channel, such as a two-channel input, namely left and right channels of a stereophonic recording of a musical work, or there may be more than two input audio channels, such as for example the entire audio soundtrack in 5.1-surround format of a motion picture film or movie. Other audio format examples are 7.1 and 9.1-surround formats.

The array of loudspeaker transducers 58 can render a desired sound sphere (or approximation thereof) based on a combination of sphere component segmentations 52*a* . . . 52N applied to the audio content by the audio rendering processor 50. Rendering processors 50 according to FIG. 9 conceptually can be divided between sphere component domain and a loudspeaker transducer domain. In the component domain, the segment processing 53*a* . . . 53N for each constituent sphere component 52*a* . . . 53N can be applied to the audio content in correspondence with a desired sphere component in a manner described above. An equalizer 54*a*. 54N can provide equalization to each respective sphere component 52*a* . . . 52N to adjust for variation in Directivity Factor arising from the particular audio device 10, and from any sphere adjustment towards a desired asymmetrical ellipsoid sphere contour, mentioned above.

In the loudspeaker transducer domain, a Sphere Domain Matrix can be applied to the various sphere domain signals to provide a signal to be reproduced by each respective loudspeaker transducer in the array 58. Generally speaking, the matrix is an M×N sized matrix, with N is the number of loudspeaker transducers, and M=(2×N)+(2×O) where O represents the number of virtual sphere components. An equalizer 56*a* . . . 56N can provide equalization to each respective sphere component 57*a* . . . 57N to adjust for variation in Directivity Factor arising from the particular audio device 10, and from any sphere adjustment towards a desired ellipsoid sphere contour, mentioned above.

Figure 10:
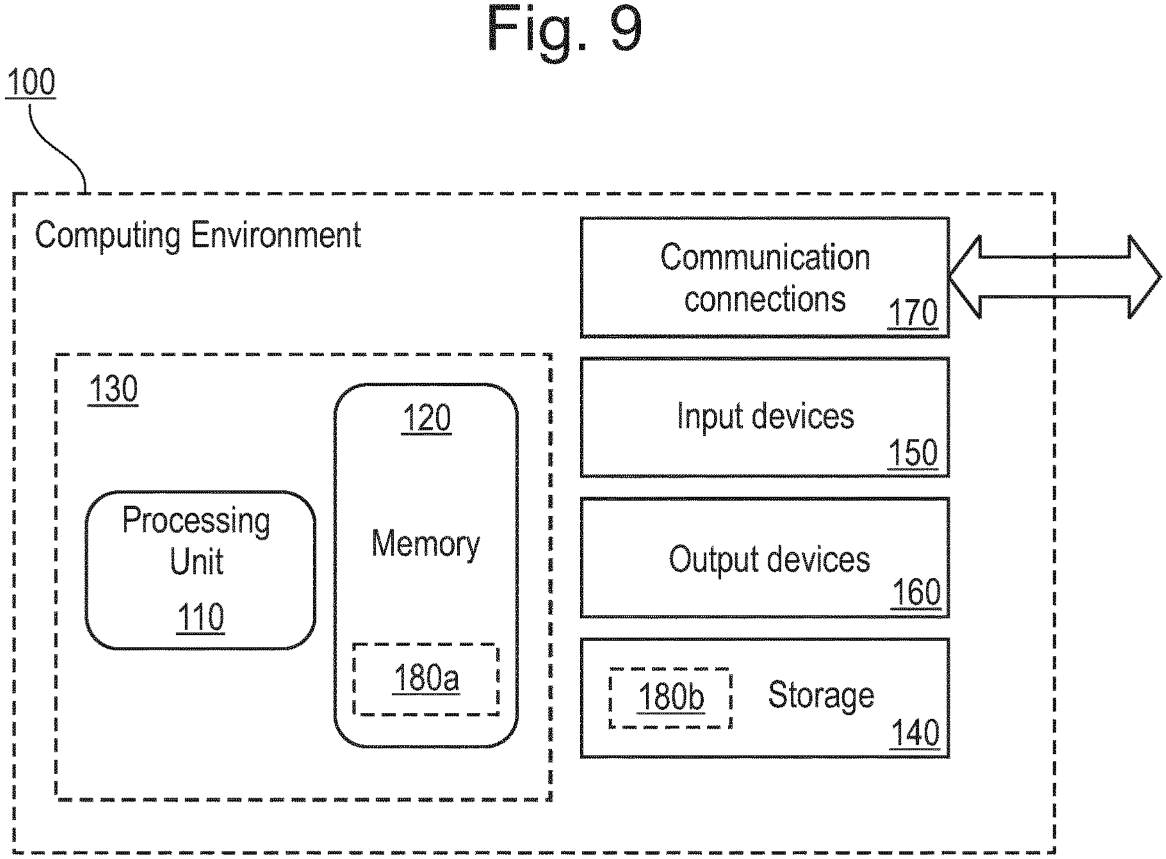
FIG. 10 illustrates another audio processing environment.

It should be understood the audio rendering processor 50 is capable of performing other signal processing operations in order to render the input audio signal for playback by the transducer array 58 in a desired manner. In another embodiment, in order to determine how to modify the loudspeaker transducer signal, the audio rendering processor may use an adaptive filter process to determine constant, or varying, boundary frequencies. FIG. 10 shows a block diagram of an audio rendering processor for an audio device 10 to render a synthesized sound (e.g., a digital keyboard, a digital audio workstation (DAW)), or an electric and/or acoustic musical instrument.

VII. Computing Environments

FIG. 10 illustrates a generalized example of a suitable computing environment 100, which may comprise the operation of the controller 50, in which described methods, embodiments, techniques, and technologies relating, for example, to procedurally generating a sound sphere. The computing environment 100 is not intended to suggest any limitation as to scope of use or functionality of the technologies disclosed herein, as each technology may be implemented in diverse general-purpose or special-purpose computing environments. For example, each disclosed technology may be implemented with other computer system configurations, including wearable and handheld devices, mobile-communications devices, multiprocessor systems, microprocessor-based or programmable consumer electronics, embedded platforms, network computers, minicomputers, mainframe computers, smartphones, tablet computers, data centers, and the like. Each disclosed technology may also be practiced in distributed computing environments where tasks are performed by remote processing devices that are linked through a communications connection or network, or that are incorporated into digital or analog musical instruments. In a distributed computing environment, program modules may be located in both local and remote memory storage devices.

The computing environment 100 includes at least one central processing unit 110 and memory 120. In FIG. 10, this most basic configuration 130 is included within a dashed line. The central processing unit 110 executes computer-executable instructions and may be a real or a virtual processor. In a multi-processing system, multiple processing units execute computer-executable instructions to increase processing power and as such, multiple processors can run simultaneously. The memory 120 may be volatile memory (e.g., register, cache, RAM), non-volatile memory (e.g., ROM, EEPROM, flash memory, etc.), or some combination of the two. The memory 120 stores software 180*a* that can, for example, implement one or more of the innovative technologies described herein, when executed by a processor.

A computing environment may have additional features. For example, the computing environment 100 includes storage 140, one or more input devices 150, one or more output devices 160, and one or more communication connections 170. An interconnection mechanism (not shown) such as a bus, a controller, or a network, interconnects the components of the computing environment 100. Typically, operating system software (not shown) provides an operating environment for other software executing in the computing environment 100, and coordinates activities of the components of the computing environment 100.

The storage 140 may be removable or non-removable, and can include selected forms of machine-readable media that includes magnetic disks, magnetic tapes or cassettes, non-volatile solid-state memory, CD-ROMs, CD-RWs, DVDs, magnetic tape, optical data storage devices, and carrier waves, or any other machine-readable medium which can be used to store information and which can be accessed within the computing environment 100. The storage 140 stores instructions for the software 180*b*, which can implement technologies described herein.

The storage 140 can also be distributed over a network so that software instructions are stored and executed in a distributed fashion. In other embodiments, some of these operations might be performed by specific hardware components that contain hardwired logic. Those operations might alternatively be performed by any combination of programmed data processing components and fixed hardwired circuit components.

The input device(s) 150 may be a touch input device, such as a keyboard, keypad, mouse, pen, touchscreen, touch pad, or trackball, a voice input device, a scanning device, or another device, that provides input to the computing environment 100. For audio, the input device(s) 150 may include a microphone or other transducer (e.g., a sound card or similar device that accepts audio input in analog or digital form), or a computer-readable media reader that provides audio samples to the computing environment 100.

The output device(s) 160 may be a display, printer, speaker transducer, DVD writer, or another device that provides output from the computing environment 100.

The communication connection(s) 170 enable communication over communication medium (e.g., a connecting network) to another computing entity. The communication medium conveys information such as computer-executable instructions, compressed graphics information, processed signal information (including processed audio signals), or other data in a modulated signal.

Thus, disclosed computing environments are suitable for performing disclosed orientation estimation and audio rendering processes as disclosed herein.

Machine-readable media are any available media that can be accessed within a computing environment 100. By way of example, and not limitation, with the computing environment 100, machine-readable media include memory 120, storage 140, communication media (not shown), and combinations of any of the above. Tangible machine-readable (or computer-readable) media exclude transitory signals.

As explained above, some disclosed principles can be embodied in a tangible, non-transitory machine-readable medium (such as a micro-electronic memory) having stored thereon instructions, which program one or more data processing components (generically referred to here as a "processor") to perform the digital signal processing operations described above including estimating, adapting, computing, calculating, measuring, adjusting (by the audio processor 50), sensing, measuring, filtering, addition, subtraction, inversion, comparisons, and decision-making. In other embodiments, some of these operations (of a machine process) might be performed by specific electronic hardware components that contain hardwired logic (e.g., dedicated digital filter blocks). Those operations might alternatively be performed by any combination of programmed data processing components and fixed hardwired circuit components.

The audio device 10 can include a loudspeaker cabinet 12 configured to produce sound. The audio device 10 can also include a processor, and a non-transitory machine readable medium (memory) in which instructions are stored which, when executed by the processor, automatically perform the three-dimensional sphere construct processes, and supporting processes, as described herein.

The examples described above generally concern apparatus, methods, and related systems for rendering audio, and more particularly, to providing desired three-dimensional sphere patterns. Nonetheless, embodiments other than those described above in detail are contemplated based on the principles disclosed herein, together with any attendant changes in configurations of the respective apparatus described herein.

Directions and other relative references (e.g., up, down, top, bottom, left, right, rearward, forward, etc.) may be used to facilitate discussion of the drawings and principles herein, but are not intended to be limiting. For example, certain terms may be used such as "up", "down", "upper", "lower", "horizontal", "vertical", "left", "right", and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or". Moreover, all patent and non-patent literature cited herein is hereby incorporated by reference in its entirety for all purposes.

The principles described above in connection with any particular example can be combined with the principles described in connection with another example described herein. Accordingly, this detailed description shall not be construed in a limiting sense, and following a review of this disclosure, those of ordinary skill in the art will appreciate the wide variety of signal processing and audio rendering techniques that can be devised using the various concepts described herein.

Moreover, those of ordinary skill in the art will appreciate that the exemplary embodiments disclosed herein can be adapted to various configurations and/or uses without departing from the disclosed principles. Applying the principles disclosed herein, it is possible to provide a wide variety of systems adapted to providing a desired three-dimensional spherical sound field. For example, modules identified as constituting a portion of a given computational engine in the above description or in the drawings can be partitioned differently than described herein, distributed among one or more modules, or omitted altogether. As well, such modules can be implemented as a portion of a different computational engine without departing from some disclosed principles.

The previous description of the disclosed embodiments is provided to enable any person skilled in the art to make or use the disclosed innovations. Various modifications to those embodiments will be readily apparent to those skilled in the art, and the generic principles defined herein may be applied to other embodiments without departing from the spirit or scope of this disclosure. Thus, the claimed inventions are not intended to be limited to the embodiments shown herein, but are to be accorded the full scope consistent with the language of the claims, wherein reference to an element in the singular, such as by use of the article "a" or "an" is not intended to mean "one and only one" unless specifically so stated, but rather "one or more". All structural and functional equivalents to the features and methods acts of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure is explicitly recited in the claims. No claim recitation is to be construed, unless the recitation is expressly recited using the phrase "means for" or "step for".

Thus, in view of the many possible embodiments to which the disclosed principles can be applied, we reserve the right to claim any and all combinations of features and technologies described herein as understood by a person ordinary skilled in the art, including, for example, all that comes within the scope of the technology.

The invention claimed is:

1. A method of outputting sound based on an audio signal, the method comprising:
   - receiving the audio signal,
   - generating audio sub signals from the audio signal, each audio sub-signal representing the audio signal within a frequency interval within the frequency interval of 100-8000 Hz, where the frequency interval of one of the audio sub signals is not fully included in the frequency interval of another of the audio sub signals,
   - providing a speaker comprising a plurality of sound output loudspeaker transducers each capable of outputting sound in at least the interval of 100-8000 Hz, the loudspeaker transducers being positioned within a room or venue,
   - generating an electrical sub signal for each loudspeaker transducer, each electrical sub signal comprising a predetermined portion of each audio sub signal, and
   - feeding the electrical sub signals to the loudspeaker transducers,
   - wherein the generation of the electrical sub signals comprises:
     - altering, over time, the predetermined portions of the audio sub signals in each electrical sub signal and
     - providing the electrical sub signals with the same sound energy, loudness or intensity.

2. The method according to claim 1, wherein the step of receiving the audio signal comprises receiving a stereo signal, and
   - wherein the step of generating the audio sub signals comprises generating, for each channel in the stereo audio signal, a plurality of the audio sub signals.

3. The method according to claim 1, wherein the step of receiving the audio signal comprises receiving a mono signal and generating from the audio signal a second signal being phase inverted to the mono signal, and
   - wherein the step of generating the audio sub signals comprises generating a plurality of the audio sub signals for each of the mono audio signal and the second signal.

4. The method according to claim 1, further comprising the step of deriving, from the audio signal, a low frequency portion thereof having frequencies below a first threshold frequency and including the low frequency portion evenly in all electrical sub signals.

5. The method according to claim 1, further comprising the step of deriving, from the audio signal, a high frequency portion thereof having frequencies above a second threshold frequency and including the high frequency portion evenly in all electrical sub signals.

6. The method according to claim 1, wherein the step of generating the audio sub signals comprises selecting the frequency interval for one or more of the audio sub signals so that an energy/loudness in each audio sub signal is within 10% of a predetermined energy/loudness value.

7. The method according to claim 1, wherein the step of generating the electrical sub signals comprises, for one or more electrical sub signal(s), generating the electrical sub signal so that a portion of an audio sub band represented in an electrical sub band increases or decreases by at least 5% per second.

8. A system for outputting sound based on an audio signal, the system comprising:
   - an input for receiving the audio signal,
   - a speaker comprising a plurality of sound output loudspeaker transducers each capable of outputting sound in at least the interval of 100-8000 Hz, the loudspeaker transducers being positioned within a room or venue,
   - a controller configured to:
   - generate audio sub signals from the audio signal, each audio sub-signal representing the audio signal within a frequency interval within the frequency interval of 100-8000 Hz, where the frequency interval of one of the audio sub signals is not fully included in the frequency interval of another of the audio sub signals,
   - generate an electrical sub signal for each loudspeaker transducer, each electrical sub signal comprising a predetermined portion of each audio sub signal, and
   - means for feeding the electrical sub signals to the loudspeaker transducers,
   - wherein the controller is configured to generate each of the electrical sub signal so that:
     - the predetermined portions of the audio sub signals in each electrical sub signal altering over time and
     - a sound energy, loudness or intensity of the electrical sub signals is the same.

9. The system according to claim 8, wherein the input is configured to receive a stereo signal, and
   - wherein the controller is configured to generate a plurality of the audio sub signals for each channel in the stereo audio signal.

10. The system according to claim 8, wherein the input is configured to receive a mono signal and wherein the controller is configured to generate, from the audio signal, a second signal being phase inverted to the mono signal, and to generate a plurality of the audio sub signals for each of the mono audio signal and the second signal.

11. The system according to claim 8, wherein the controller is further configured to derive, from the audio signal, a low frequency portion thereof having frequencies below a first threshold frequency and include the low frequency portion evenly in all electrical sub signals.

12. The system according to claim 8, wherein the controller is further configured to derive, from the audio signal, a high frequency portion thereof having frequencies above a second threshold frequency and include the high frequency portion evenly in all electrical sub signals.

13. The system according to claim 8, wherein the controller is further configured to select the frequency interval for one or more of the audio sub signals so that an energy/loudness in each audio sub signal is within 10% of a predetermined energy/loudness value.

14. The system according to claim 8, wherein the controller is further configured to, for one or more electrical sub signal(s), generate the electrical sub signal so that a portion of an audio sub band represented in an electrical sub band increases or decreases by at least 5% per second.

* * * * *